(12) United States Patent
Bouldron et al.

(10) Patent No.: US 10,549,606 B2
(45) Date of Patent: Feb. 4, 2020

(54) AERATOR AND VEHICLE COMPRISING SUCH AN AERATOR

(71) Applicant: Faurecia Interieur Industrie, Nanterre (FR)

(72) Inventors: Ludovic Bouldron, Pontoise (FR); Jean-Baptiste Vuattoux, Ermont (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 313 days.

(21) Appl. No.: 14/869,521

(22) Filed: Sep. 29, 2015

(65) Prior Publication Data

US 2016/0089959 A1    Mar. 31, 2016

(30) Foreign Application Priority Data

Sep. 30, 2014 (FR) ...................... 14 59303

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .................................................. B60H 1/3414
USPC .......................................... 454/152, 155, 69
See application file for complete search history.

(56) References Cited

U.S. PATENT DOCUMENTS

| 5,921,860 A | 7/1999 | Marsden |
| 7,044,849 B2 * | 5/2006 | Dippel ................ B60H 1/3407 |
| | | 454/143 |
| 2013/0210333 A1 * | 8/2013 | Kober ................ B60H 1/3442 |
| | | 454/154 |

FOREIGN PATENT DOCUMENTS

| DE | 102009009241 A1 | 8/2010 |
| EP | 2407331 A1 | 1/2010 |
| EP | 2181874 A1 | 5/2010 |

OTHER PUBLICATIONS

French Search Report for corresponding application No. 14 59303 dated Jun. 22, 2015, 2 pages, not translated.

* cited by examiner

*Primary Examiner* — Gregory L Huson
*Assistant Examiner* — Elizabeth M. May
(74) *Attorney, Agent, or Firm* — Reising Ethington P.C.

(57) ABSTRACT

An aerator having a duct and a deflector member to deflect the flow of air leaving the duct, the deflector member being mounted movably relative to the duct by means of an articulation. The deflector member extends around the articulation. The articulation includes a male part having a head and a female part having a housing, the head being received in the housing to allow the adjustment of the deflector member relative to the duct. The female part further includes at least one pressing element biased to bear against the head by an elastic biasing element.

15 Claims, 4 Drawing Sheets

AERATOR AND VEHICLE COMPRISING SUCH AN AERATOR

TECHNICAL FIELD

The invention relates to the field of aerators comprising an outlet duct on which an adjustable deflector member is mounted, provided to deflect the flow of their leaving the duct in the direction desired by the user, based on the orientation of the deflector member.

Such an aerator is for example positioned at the outlet of a heating, ventilation and air-conditioning system of a vehicle, in particular a motor vehicle (generally referred to as an HVAC system), to allow the user to orient the flow of air.

BACKGROUND

US 2013/0210333 A1 discloses an aerator in which the deflector member is mounted in the duct by means of a ball and socket joint comprising a ball joint head made in two spherical segments biased away from one another by a spring.

SUMMARY

One aim of the invention is to propose an aerator that is easy to use, operates durably and is easy to manufacture.

To that end, the invention in one aspect proposes an aerator comprising a duct and a deflector member to deflect the flow of air leaving the duct, the deflector member being mounted movably relative to the duct by means of an articulation, the deflector member being positioned around the articulation, the articulation comprising a male part having a head and a female part having a housing, the head being received in the housing to allow the adjustment of the deflector member relative to the duct, the female part further comprising at least one pressing element biased to bear against the head by an elastic biasing element.

The aerator optionally comprises one or more of the following features, considered alone or according to all technically possible combinations:
  the articulation is a ball and socket articulation;
  the articulation is a pivot articulation;
  the elastic biasing element is a compression spring;
  the articulation has a case formed by two separate parts fastened on one another, the case delimiting the housing, the pressing element and the spring being received in the case, the articulation being kept dissembled due to the fastening of the two parts on one another;
  the two parts are fastened on one another by snapping;
  the deflector member is formed by two components fastened on one another, each component bearing a respective part of the case, at least one of the components bearing at least one deflector element;
  the deflector member bears the female part and the duct bears the male part;
  the deflector member has at least one annular deflector element surrounding the articulation while being spaced radially away from the articulation and/or at least one radial deflector element arranged radially between the articulation and an inner surface of the duct.

The invention also relates to a vehicle comprising an aerator as defined above.

BRIEF DESCRIPTION OF THE DRAWINGS

The invention and its advantages will be better understood upon reading the following description, provided solely as an example, and done in reference to the appended drawings, in which.

DETAILED DESCRIPTION OF PREFERRED EMBODIMENTS

Figure 1:
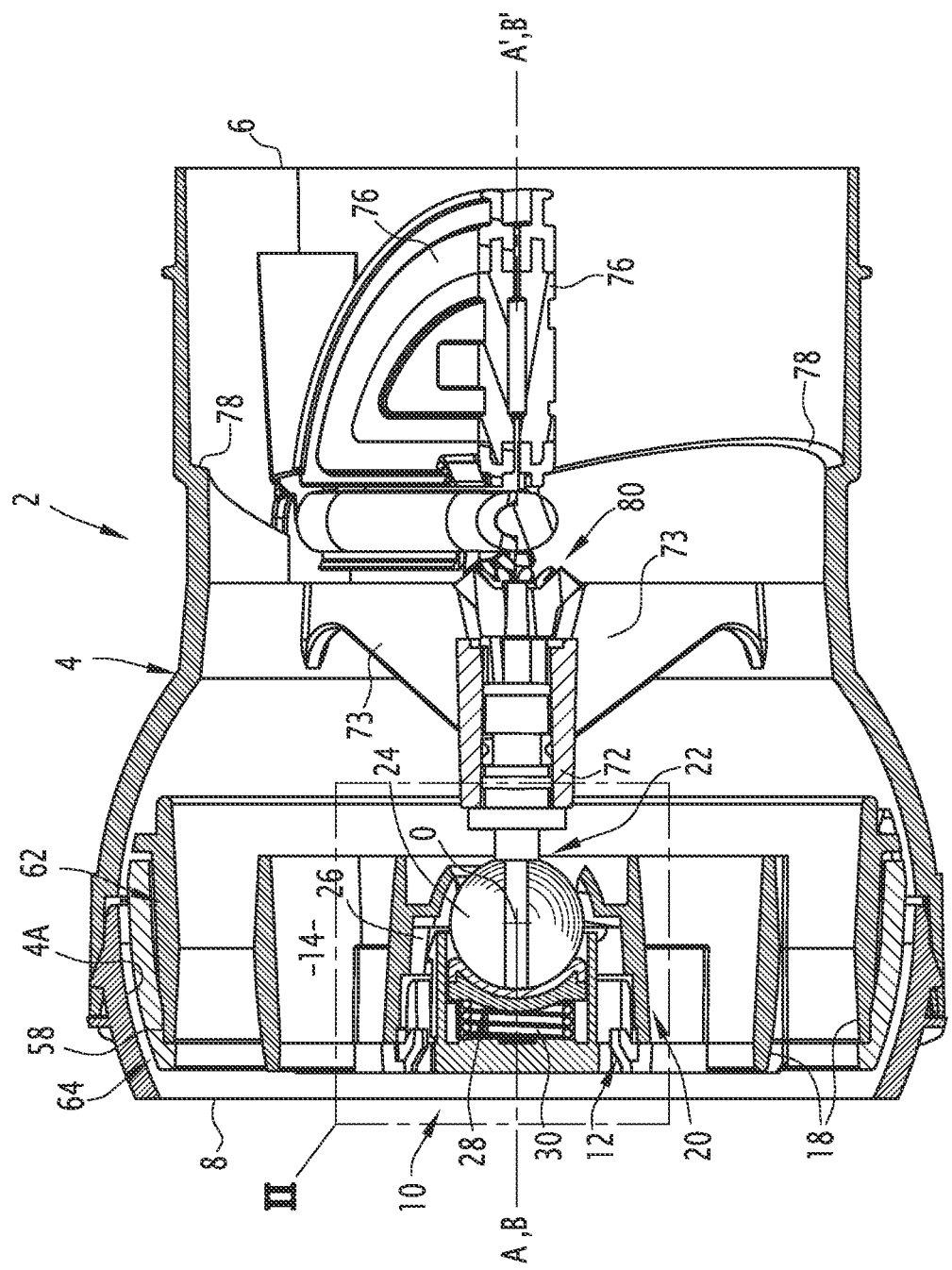
FIG. 1 is a cross-sectional view of an aerator.

The aerator 2 illustrated in FIG. 1 is designed to be positioned at the outlet of an aeraulic circuit of an aeration system, in particular a heating, ventilation and air-conditioning (HVAC) system of a vehicle, in particular a motor vehicle.

The aerator 2 comprises a tubular aeraulic duct 4 that has an air inlet 6 and an air outlet 8. The air outlet 8 of the duct 4 extends along an axis A-A'. The air inlet 6 is designed to be fluidly connected to the aeraulic circuit. The duct 4 is provided for an air circulation from its air inlet 6 toward its air outlet 8, the flow of air being ejected to the outside of the air outlet 8 of the duct 4.

The aerator 2 comprises an adjustable deflector member 10 positioned at the air outlet 8 of the duct 4 and provided to deflect the flow of air leaving the aerator 2 in the desired direction. The direction of the flow of air leaving the aerator 2 depends on the orientation of the deflector member 10.

The deflector member 10 has an axis B-B'. The deflector member 10 orients the flow of air along its axis B-B'. The adjustable deflector member 10 is able to be oriented relative to the duct 4 to incline the axis B-B' of the deflector member 10 relative to the axis A-A' of the air outlet 8 of the duct 4. In FIG. 1, the axes A-A' and B-B' are combined.

The deflector member 10 is received inside the duct 4 while being mounted movably relative to the duct 4 by means of an articulation 12 allowing a relative angular movement between the deflector member 10 and the duct 4, around at least one rotation axis.

The articulation 12 is situated inside the duct 4 such that the flow of air flows in an annular passage 14 delimited between the articulation 12 and the inner surface of the duct 4. The articulation 12 is centered on the axis A-A' of the outlet of the duct 4. The articulation 12 is centered on a center of rotation O corresponding to the intersection between the axis A-A' of the air outlet 8 of the duct 4 and the axis B-B' of the deflector member 10, when they are inclined relative to one another.

The deflector member 10 is able to deflect the flow of air leaving the duct 4. The deflector member 10 extends around the articulation 12. The deflector member 10 extends between the articulation 12 and the inner surface 4A of the duct 4, in the annular passage 14 defined between them. The deflector member 10 here surrounds the articulation 12.

The deflector member 10 comprises deflector elements 16, 18 extending in the flow of air leaving the aerator 2. The deflector elements 16, 18 are able to deflect the flow of air. The deflector elements 16, 18 are positioned around the articulation 12, between the articulation 12 and the inner surface 4A of the duct, in the annular passage 14.

Figure 2:
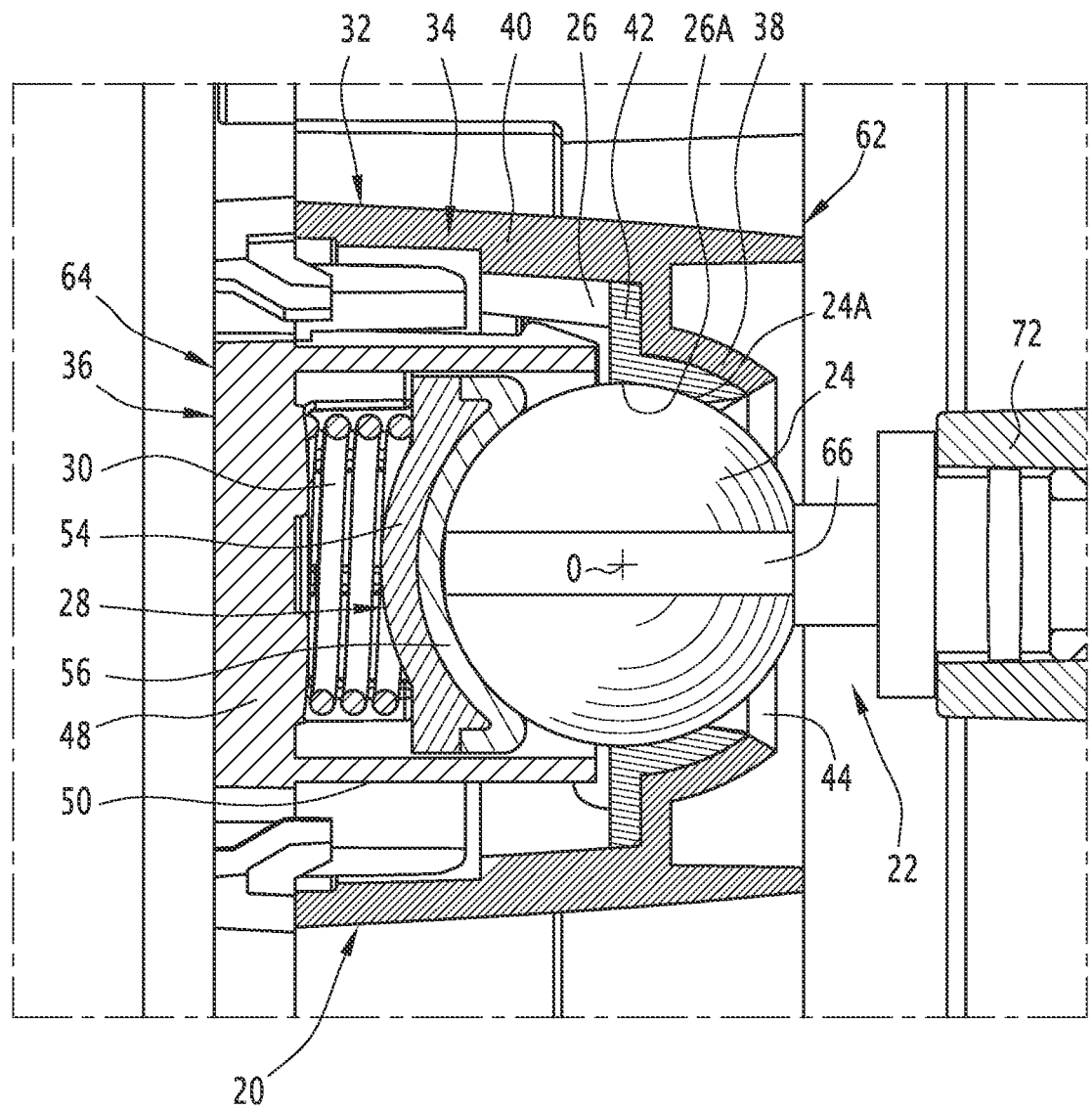
FIG. 2 is an enlargement of zone II-II in FIG. 1.
Figure 3:
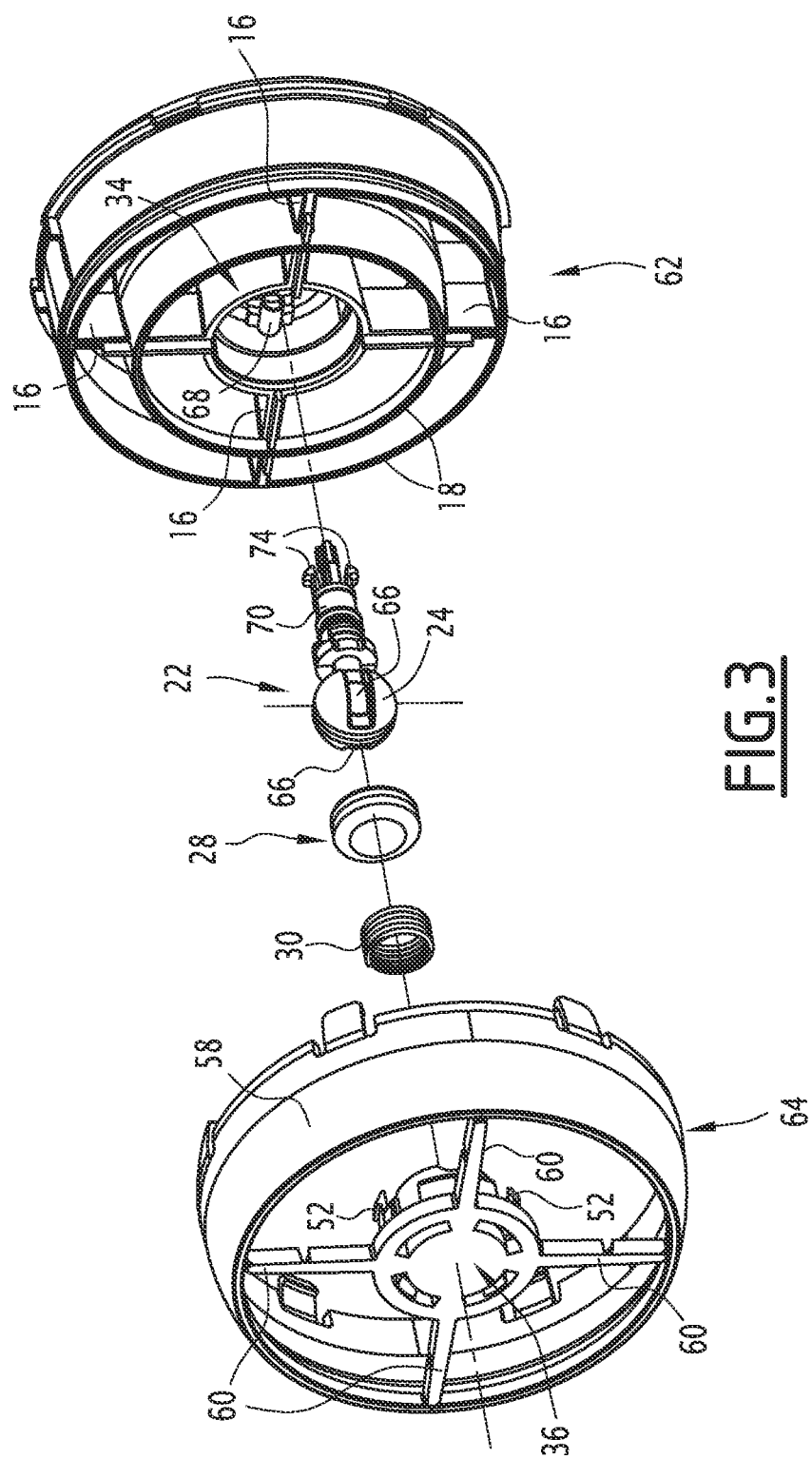
FIG. 3 is an exploded perspective view of the deflector member of the aerator.

As illustrated in FIGS. 2 and 3, the articulation 12 comprises a female part 20 and a male part 22 that are complementary.

The male part 22 comprises an articulation head 24 and the female part 20 comprises a housing 26 for receiving the articulation head 24. The head 24 is engaged in the housing 26 to allow the orientation of the deflector member 10 relative to the duct 4. The head 24 and the housing 26 have complementary sliding surfaces 24A, 26A in contact with one another to guide the movement of the deflector member 10 relative to the duct 4. The inner sliding surface 26A of the housing 26 is concave and the outer sliding surface 24A of the head 24 is convex.

The articulation 12 here is a ball and socket articulation 12. The complementary sliding surfaces 24A, 26A of the head 24 of the housing 26 are spherical and centered on the center O of the articulation 12.

The female part 20 further comprises a pressing element 28 movable relative to the sliding surface of the housing 26 and biased to bear against the head 24 by an elastic biasing element 30. The pressing element 28 bearing against the head 24 opposes the relative angular movement of the head 24 and the housing 26, by rubbing against the head 24. The elastic biasing element 30 presses the pressing element 28 against the head 24.

The female part 20 comprises a case 32 in which the housing 26 is defined. The case 32 is formed by a first case 32 part 34 and a second case 32 part 36, which are separate, and which are fastened on one another.

The first part 34 defines the housing 26 and bears the sliding surface of the housing 26. The head 24, the pressing element 28 and the elastic biasing element 30 are received in the case 32, between the first part 34 and the second part 36. The head 24 bears on the first part 34 and the elastic biasing element 30 bears on the second part 36, the pressing element 28 being inserted between the elastic biasing element 30 and the head 24. The pressing element 28 is mounted sliding on the second part 36.

The elastic biasing element is for example a spring, in particular a compression spring (FIG. 2), a plate spring, or a set of Belleville washers.

The first part 34 assumes the form of a tubular bush having a bottom 38 and a circumferential tubular wall 40 extending along the axis B-B'. The sliding surface 26A of the housing 26 is provided on the bottom 38. The sliding surface 26A of the housing 26 here is formed by a coating 42 that covers the bottom 38 and bears the sliding surface 26A. Alternatively, the coating is omitted and the sliding surface 26A of the housing 26 is formed on the bottom 38, the head 24 being directly in contact with the bottom 38.

The bottom 38 has a central opening 44. The sliding surface 26A of the housing 26 has an annular shape, here around the axis B-B'.

The second part 36 assumes the form of a stopper 46 closing the first part 34 on the side opposite the bottom 38. The second part 36 has a front wall 48 opposite the bottom. The second part 36 has a tubular guide jacket 50 extending the front wall 48 toward the inside of the housing 26, toward the sliding surface 26A of the housing 26. The guide jacket 50 extends along the axis B-B'. The pressing element 28 is slidingly received in the guide jacket 50, here along the axis B-B'. The elastic biasing element 30 is inserted between the front wall 48 and the pressing element 28, so as to bias the pressing element 28 away from the front wall 48.

The first part 34 and the second part 36 are fastened on one another by snapping. The first part 34 and the second part 36 comprise complementary snapping elements. One of the first part 34 and the second part 36 has at least one snapping hook cooperating with a stop surface of the other among the first part 34 and the second part 36.

The second part 36 here has snapping hooks 52 cooperating with corresponding stop surfaces of the first part 34. Here, the hooks 52 are provided on the guide jacket 50. Alternatively, the configuration is reversed: the first part 34 has snapping hooks cooperating with stop surfaces of the second part 36.

The pressing element 28 assumes the form of a spherical cap. The pressing element 28 comprises a substrate 54 and a fitting 56. The substrate 54 is rigid to receive the stress of the elastic biasing element 30 and distribute it on the fitting 56, which is flexible. The fitting is for example made from silicone, elastomer, rubber, or any other appropriate material. This arrangement thus advantageously makes it possible to have sufficient maintenance of the deflector member 10 on the articulation 12 while having a low, homogenous maneuvering force not generating any vibrations, which makes it possible to improve the perceived quality of the aerator. It is thus flexible and not noisy to use. Alternatively, the pressing element 28 is formed in a single piece, preferably from an adhesive material.

The female part 20 is supported by the deflector member 10. More specifically, the case 32 of the female part 20 is supported by the deflector member 10. The deflector member 10 is rigidly connected to the case 32.

As shown in FIG. 3, the deflector elements 16, 18 are rigidly connected to the case 32 of the female part 20 and are mobile relative thereto.

The deflector member 10 here comprises four radial deflector elements 16 distributed at 90° around the axis B-B' of the deflector member 10 and intersecting two concentric annular deflector elements 18 surrounding the articulation 12.

Alternatively, the number of annular and radial deflector elements may vary.

In general, the deflector member 10 comprises at least one annular deflector element surrounding the articulation 12 and/or at least one radial deflector element extending radially outward from the case 32 of the articulation 12.

Other arrangements of deflector elements can be considered. In one possible alternative, the deflector member 10 comprises a plurality of deflector elements parallel to one another.

As illustrated in FIG. 1, the deflector elements 16, 18 are positioned around the articulation 12. The articulation 12 is completely contained in the axial bulk of the set of deflector elements 16, 18 considered along the axis B-B' of the deflector member 10. The articulation 12 is completely contained in the volume delimited between two planes parallel to one another and perpendicular to the axis B-B' of the deflector member 10 between which the deflector elements 16, 18 are fully contained. The planes are tangent to the ends of deflector elements, one plane passing through the furthest upstream deflector element end and the other through the furthest downstream deflector element end considering the airflow direction. This preserves the compactness of the aerator 2 and facilitates its design.

The deflector member 10 comprises an annular cover 58 provided to cover an annular deflector element 18, here that with the largest diameter. The cover 58 is rigidly connected to the second part 36 of the case 32 by radial arms 60. The radial arms 60 are preferably aligned with the radial deflector elements 16. Each radial arm 60 conceals a respective radial deflector element 16.

The cover 58 is fastened to the deflector element 18 that it covers by snapping. The deflector member 10 has snapping hooks provided on one of the cover and the deflector element 18, and associated stop surfaces provided on the other. Here, the hooks are provided on the cover 58, and the stop surfaces on the annular deflector element 18. Alternatively, the configuration is reversed.

The deflector member 10 thus comprises a first component 62 including the first part 34 of the case 32 of the articulation 12 and the deflector elements 16, 18, and a second component 64 including the second part 36 of the case 32 of the articulation 12. The first component 62 and the second component 64 are fastened on one another, here by snapping. The snapping is done on the one hand between the first part 34 of the case 32 and the second part 36 of the case 32, and on the other hand, between the cover 58 and the deflector element 18 that it covers.

As shown in FIG. 3, the ball and socket articulation 12 is locked in rotation around the rotation axis. To that end, the ball and socket articulation 12 has at least one groove 66 arranged on one of the head 24 and the housing 26, and a finger 68 provided on the other and received in the groove 66. Here, two diametrically opposite grooves 66 are provided on the head 24 and two corresponding fingers 68 are provided here on the housing 26, only one groove 66 and only one finger 68 being shown in FIG. 3. The grooves 66 extend along the axis A-A'. The articulation 12 is a finger and ball joint articulation.

The male part 22 comprises an assembly rod 70 rigidly secured to the head 24 and extending from the head 24 along the axis A-A'. The assembly rod 70 leaves the housing 26 by crossing through the opening 44. The assembly rod 70 is inserted inside a tubular sleeve 72 provided in the duct 4. The sleeve 72 is rigidly connected to the duct 4 by radial arms 73. Two radial arms are visible in FIG. 1. The assembly rod 70 is snapped in the sleeve 72. To that end, the assembly rod 70 comprises, at its end opposite the head 24, snapping hooks 74.

The aerator 2 comprises closing flaps 76 mounted movably inside the duct 4, upstream from the deflector member 10, between an open position (FIG. 2) allowing the flow of air to flow from the air inlet 6 toward the air outlet 8, and a closed position, in which the flaps 76 extend through the duct 4, in contact with sealing seats 78, and prevent the air flow from flowing in the duct 4.

The flaps 76 are connected to the deflector member 10 such that the rotation of the deflector member 10 around its axis B-B' commands the movement of the flaps. To that end, the rod is connected to the flaps 76 by angular transmission gears 80, such that a rotation of the rod around the axis A-A', caused by a rotation of the deflector member 10 around the axis B-B', closes or opens the flaps 76 depending on the direction of rotation.

Figure 4:
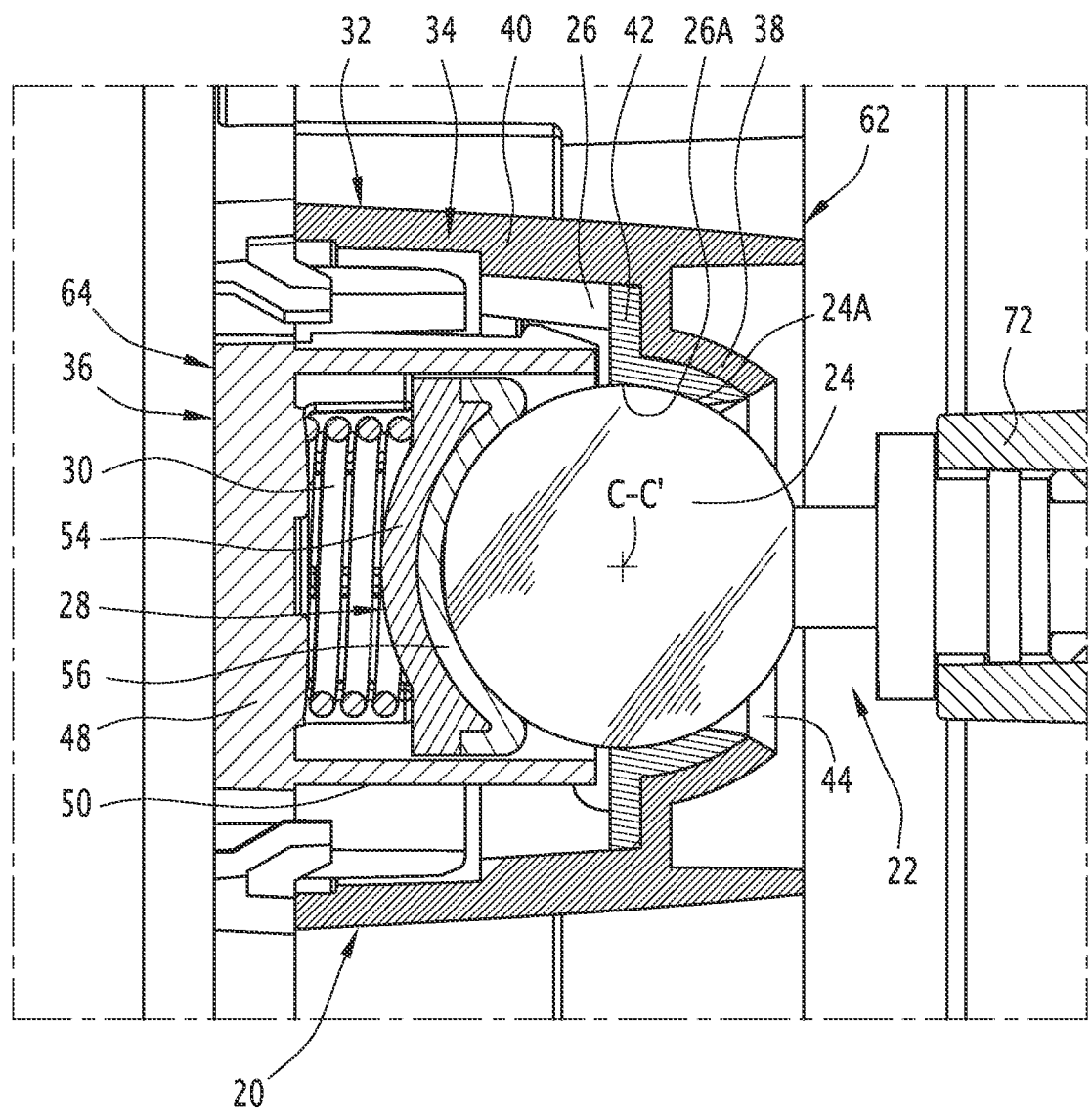
FIG. 4 is a view similar to FIG. 2 illustrating an alternative.

In an alternative illustrated in FIG. 4, the articulation 12 is a pivot articulation allowing a rotation around a single pivot axis C-C' perpendicular to the axis A-A' and the axis B-B'. In this alternative, the counterpart sliding surfaces 24A, 26A of the head 24 and the housing 26 are cylindrical along the pivot axis C-C'. The pressing element 28 has a cylindrical bearing surface along the pivot axis C-C' in contact with the head 24.

The deflector member 10 and the male part 22 are connected in rotation around the axis A-A'. The rotation of the deflector member 10 around the axis A-A' drives the rotation of the male member around the axis A-A', which makes it possible to close the flaps 76.

During operation, the pressing element 28 biased by the elastic biasing element 30 makes it possible to generate a force keeping the deflector member 10 in position that is sufficient and substantially constant over the lifetime of the aerator 2. The quality perceived by the user is then positive.

The articulation 12 situated at the center of the duct 4, with the deflector member 10 extending around the articulation 12 and the flow of air passing in an annular passage defined around the articulation 12, allows a greater design freedom for the aerator 2, in particular for the shape of the deflector member 10, which is not directly dictated by the degrees of freedom desired for the articulation 12.

The assembly of the aerator 2 is easy. The head 24 of the male part 22, the pressing element 28 and the elastic biasing element 30 are inserted into the housing 26, between the two parts of the case 32 of the articulation 12, which are then closed and fastened on one another, in particular by snapping. Next, the rod of the male part 22, protruding from the case 32 of the articulation 12, is inserted in the corresponding support of the duct 4. The deflector member 10 is thus mounted on the duct 4.

The invention claimed is:

1. An aerator comprising a duct and a deflector member to deflect a flow of air leaving the duct, the deflector member being mounted movably relative to the duct by an articulation,
    the articulation comprising a male part having a head and a female part having a housing,
    the head being received in the housing to allow adjustment of the deflector member relative to the duct,
    the female part further comprising at least one pressing element biased to bear against the head by an elastic biasing element,
    wherein the head and the housing have complementary sliding surfaces and are both surrounded by the deflector member,
    wherein the female part of the articulation has a case formed by a first part and a second part fastened on one another, the case delimiting the housing, the pressing element and the biasing element being received in the case, the articulation being kept hidden due to the fastening of the first and second parts on one another,
    the first part having the form of a tube with a bottom on which the sliding surface of the housing is defined, and the second part closing the tubular first part at a side opposite the bottom, the pressing element and the elastic element being positioned between the second part and the head of the male part, and
    wherein the second part has a front wall and a tubular guide jacket extending from the front wall toward the sliding surface of the housing, the pressing element being slidingly received in the guide jacket and the elastic biasing element being inserted between the front wall and the pressing element so as to bias the pressing element away from the front wall.

2. The aerator according to claim 1, wherein the articulation is a ball and socket articulation.

3. The aerator according to claim 1, wherein the articulation is a pivot articulation.

4. The aerator according to claim 1, wherein the elastic biasing element is a compression spring.

5. The aerator according to claim 1, wherein the sliding surface of the housing comprises at least a portion of a sphere and the sliding surface of the head is an external surface of the head, the pressing element also being in contact with the external surface of the head to push the head toward the sliding surface of the housing.

6. The aerator according to claim 1, wherein the first and second parts are fastened on one another by snapping.

7. The aerator according to claim 1, wherein the deflector member is formed by two components fastened on one another, at least one of the components bearing at least one deflector element.

8. The aerator according to claim 1, wherein the deflector member bears the female part and the duct bears the male part.

9. The aerator according to claim 1, wherein the deflector member has at least one annular deflector element surrounding the articulation while being spaced radially away from the articulation and/or at least one radial deflector element arranged radially between the articulation and an inner surface of the duct.

10. A vehicle comprising an aerator according to claim 1.

11. The aerator according to claim 1,
wherein the deflector member comprises a first component, a second component, radial deflectors, and an annular deflector, the first component including the first part of the case, and the second component including the second part of the case and a cover for covering the radial deflectors and the annular deflector.

12. The aerator according to claim 1, wherein the pressing element comprises a substrate and a flexible fitting, the substrate being rigid to receive the stress of the elastic biasing element and distribute the stress of the elastic biasing element on the flexible fitting.

13. The aerator according to claim 1, wherein the male part comprises an assembly rod rigidly secured to the head, the assembly rod extending from the head and out of the housing through an opening of the housing.

14. The aerator according to claim 1, wherein the first part defines the housing, and
wherein the head, the pressing element, and the elastic biasing element are received in the case between the first part and the second part, the pressing element being mounted slidingly on the second part.

15. The aerator according to claim 1, wherein the bottom of the first part has a central opening and the sliding surface of the housing has an annular shape.

\* \* \* \* \*